United States Patent
McDonald et al.

(10) Patent No.: US 8,477,188 B2
(45) Date of Patent: Jul. 2, 2013

(54) SURVEILLANCE SYSTEM FOR TRANSCODING SURVEILLANCE IMAGE FILES WHILE RETAINING GEOSPATIAL METADATA AND ASSOCIATED METHODS

(75) Inventors: Robert McDonald, Palm Bay, FL (US); Kari J. Bonestroo, Cocoa, FL (US); John Delay, Mason, OH (US); Tariq Bakir, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 516 days.

(21) Appl. No.: 12/579,217

(22) Filed: Oct. 14, 2009

(65) Prior Publication Data
US 2011/0085034 A1    Apr. 14, 2011

(51) Int. Cl.
*H04N 7/18*    (2006.01)

(52) U.S. Cl.
USPC ............ 348/143; 348/148; 348/155; 348/158

(58) Field of Classification Search
USPC ................. 348/143, 103, 148, 153, 154, 155, 348/158, 159
See application file for complete search history.

(56) References Cited

U.S. PATENT DOCUMENTS

| | | | | |
|---|---|---|---|---|
| 5,321,520 A | 6/1994 | Inga et al. | | 358/403 |
| 5,416,602 A | 5/1995 | Inga et al. | | 358/403 |
| 5,493,339 A | 2/1996 | Birch et al. | | 348/461 |
| 5,838,320 A | 11/1998 | Matthews, III et al. | | 345/341 |
| 5,874,717 A | 2/1999 | Kern et al. | | 235/379 |
| 6,160,587 A | 12/2000 | Walker et al. | | 348/478 |
| 6,178,204 B1 * | 1/2001 | Hazra | | 375/240.25 |
| 6,314,452 B1 | 11/2001 | Dekel et al. | | 709/203 |
| 6,417,867 B1 | 7/2002 | Hallberg | | 345/660 |
| 6,512,857 B1 * | 1/2003 | Hsu et al. | | 382/294 |
| 6,587,601 B1 * | 7/2003 | Hsu et al. | | 382/294 |
| 6,597,818 B2 * | 7/2003 | Kumar et al. | | 382/294 |
| 6,772,150 B1 * | 8/2004 | Whitman et al. | | 707/721 |
| 6,922,691 B2 | 7/2005 | Flank | | 707/4 |
| 6,987,451 B2 * | 1/2006 | McKeown et al. | | 340/541 |
| 6,996,520 B2 * | 2/2006 | Levin | | 704/10 |
| 7,313,252 B2 * | 12/2007 | Matei et al. | | 382/100 |
| 7,492,821 B2 * | 2/2009 | Berman et al. | | 375/240.1 |
| 7,777,912 B2 * | 8/2010 | Caine | | 358/1.2 |
| 8,005,309 B2 * | 8/2011 | Taketa et al. | | 382/240 |
| 8,254,651 B2 * | 8/2012 | Hunt et al. | | 382/128 |
| 8,363,109 B2 * | 1/2013 | Dunkel et al. | | 348/169 |
| 2001/0038718 A1 * | 11/2001 | Kumar et al. | | 382/284 |
| 2003/0004968 A1 | 1/2003 | Romer et al. | | 707/104.1 |
| 2005/0175251 A1 * | 8/2005 | Taketa et al. | | 382/248 |
| 2005/0207650 A1 * | 9/2005 | Martin et al. | | 382/190 |
| 2006/0077255 A1 | 4/2006 | Cheng | | 348/143 |
| 2006/0168615 A1 * | 7/2006 | Igler et al. | | 725/32 |
| 2006/0195876 A1 * | 8/2006 | Calisa | | 725/105 |
| 2006/0279655 A1 | 12/2006 | Chen et al. | | 348/441 |

(Continued)

*Primary Examiner* — Lashonda Jacobs
(74) *Attorney, Agent, or Firm* — Allen, Dyer, Doppelt, Milbrath & Gilchrist, P.A.

(57) ABSTRACT

A surveillance video system may include a surveillance image database storing a sequence of surveillance image files for a common area having geospatial metadata associated therewith. A processor may cooperate with the surveillance image database and configured to transcode the surveillance image files into a sequence of surveillance video frames retaining the geospatial metadata. The processor may also be configured to assemble a surveillance video transport stream from the sequence of surveillance video frames retaining the geospatial metadata, and to selectively deliver the surveillance video transport stream retaining the geospatial metadata to at least one surveillance video user.

23 Claims, 11 Drawing Sheets

U.S. PATENT DOCUMENTS

| | | | |
|---|---|---|---|
| 2007/0039030 A1* | 2/2007 | Romanowich et al. | 725/105 |
| 2007/0201052 A1* | 8/2007 | Caine | 358/1.2 |
| 2008/0036864 A1* | 2/2008 | McCubbrey et al. | 348/159 |
| 2008/0147325 A1* | 6/2008 | Maassel et al. | 702/5 |
| 2009/0012995 A1* | 1/2009 | Sartor et al. | 707/104.1 |
| 2009/0167948 A1* | 7/2009 | Berman et al. | 348/575 |
| 2009/0189981 A1* | 7/2009 | Siann et al. | 348/143 |
| 2009/0219837 A1* | 9/2009 | Chiu et al. | 370/278 |
| 2011/0085034 A1* | 4/2011 | McDonald et al. | 348/143 |
| 2011/0109747 A1* | 5/2011 | Forrester et al. | 348/152 |
| 2011/0206286 A1* | 8/2011 | Taketa et al. | 382/232 |
| 2013/0033617 A1* | 2/2013 | Schuler et al. | 348/222.1 |

\* cited by examiner

SURVEILLANCE SYSTEM FOR TRANSCODING SURVEILLANCE IMAGE FILES WHILE RETAINING GEOSPATIAL METADATA AND ASSOCIATED METHODS

FIELD OF THE INVENTION

The present invention relates to the field of video systems, and, more particularly, to surveillance video systems and related methods.

BACKGROUND OF THE INVENTION

Advancements in image sensor technology have lead to a demand for higher resolution capabilities, namely the ability to provide images with larger numbers of pixels. For example, image sensors continue to increase in the number of pixels they are able to capture.

In today's world, surveillance technology is pervasive. Surveillance technology allows the remote monitoring of a location, recording events happening at that location, and providing advanced warning of intruders or unauthorized visitors. However, a drawback in some prior art surveillance technology is that the fields of view of typical surveillance cameras are narrow, aimed at specific regions of interest. As such, cameras of a surveillance system may not be pointed in the right direction at the right time. To address this shortcoming of some surveillance systems, surveillance cameras having a greater resolution and greater field of view, based upon these recent advances in image sensor technology, may be employed.

In particular, modern image sensor technology is employed in Wide Area Persistent Surveillance (WAPS). WAPS is the photographic surveillance of an entire geographic area, rather than isolated regions of interest. WAPS is typically gathered by an unmanned aerial vehicle that uses a camera array to take a high-resolution picture of the entire geographic area. This allows the surveillance of an entire city, for example, rather than individual areas of interest in the city, thereby greatly extending the surveillance coverage.

The WAPS images are typically taken at a frequency of 1 to 10 Hz. For convenience, it may be desirable to transcode a plurality of such WAPS images to form a full motion video. However, a single WAPS image may have a resolution of ten gigapixels, for example, and may consume gigabytes worth of data storage space, which may overwhelm existing image processing techniques. Moreover, due to enhancements in satellite location technology, some WAPS images may be georeferenced. Generally speaking, georeferenced images include imagery data encapsulated with geospatial metadata that correlates the pixel space of the imagery to geospatial coordinate values, e.g., latitude/longitude coordinates.

Moreover, in mobile applications, the use of WAPS imagery may suffer from drawbacks. For example, mobile devices may have limited bandwidth and memory resources. Accordingly, the large detail and size of the WAPS files may make such applications ungainly and resource intensive. Also, the typical mobile device may have a limited screen size, thereby making viewing of WAPS imagery problematic. Further, the limited computational resources of mobile devices may make conversion of WAPS imagery undesirable.

SUMMARY OF THE INVENTION

In view of the foregoing background, it is therefore an object of the present invention to provide a video system that provides greater user convenience.

This and other objects, features, and advantages in accordance with the present invention are provided by a surveillance video system that may comprise a surveillance image database storing a sequence of surveillance image files for a common area having geospatial metadata associated therewith. A processor cooperates with the surveillance image database and may be configured to transcode the surveillance image files into a sequence of surveillance video frames retaining the geospatial metadata.

The processor may also be configured to assemble a surveillance video transport stream from the sequence of surveillance video frames retaining the geospatial metadata, and to selectively deliver the surveillance video transport stream retaining the geospatial metadata to at least one surveillance video user, for example by mapping it into MISB compliant KLV metadata.

At least one on-demand video surveillance server may be configured to selectively receive the surveillance video transport stream retaining the geospatial metadata. Additionally, the at least one on-demand video surveillance server may comprise an on-demand processor configured to selectively receive the surveillance image files retaining the geospatial metadata. Furthermore, the on-demand processor may be configured to permit adding of annotations (such as audio, text, and graphics) to at least one of the surveillance image files and the surveillance video frames.

At least one live video surveillance server may be configured to selectively receive the surveillance video transport stream retaining the geospatial metadata. The at least one live video surveillance server may comprise a live video surveillance processor configured to operate on the surveillance video stream to define at least one region of interest. Also, the at least one on-demand video surveillance server may selectively receive at least the surveillance video transport stream retaining the geospatial metadata. In addition, at least one live video surveillance server may selectively receive at least the surveillance video transport stream retaining the geospatial metadata.

The processor may also be configured to receive and insert additional metadata into the surveillance video transport stream. In some applications, the geospatial metadata may comprise metadata (i.e. geospatial, chat, annotation, and voice metadata) for each image location. Each surveillance image file may comprise a Joint Photographic Experts Group (JPEG) 2000 format file, and the surveillance video transport stream may comprise a transcoded MPEG-2 or MPEG4 H.264 video stream. The system may provide a method to publish temporal metadata in containers or as MPEG-2 transport streams.

A method aspect is directed to a method of operating a surveillance video system. The method may include storing a sequence of surveillance image files for a common area having geospatial metadata associated therewith in a surveillance image database. The method may also include transcoding, using a processor, the surveillance image files into a sequence of surveillance video frames retaining the geospatial metadata.

The method may further include assembling, using the processor, a surveillance video transport stream from the sequence of surveillance video frames retaining the geospatial metadata. The method may additionally include selectively delivering, using the processor, the surveillance video transport stream retaining the geospatial metadata to at least one surveillance video user.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
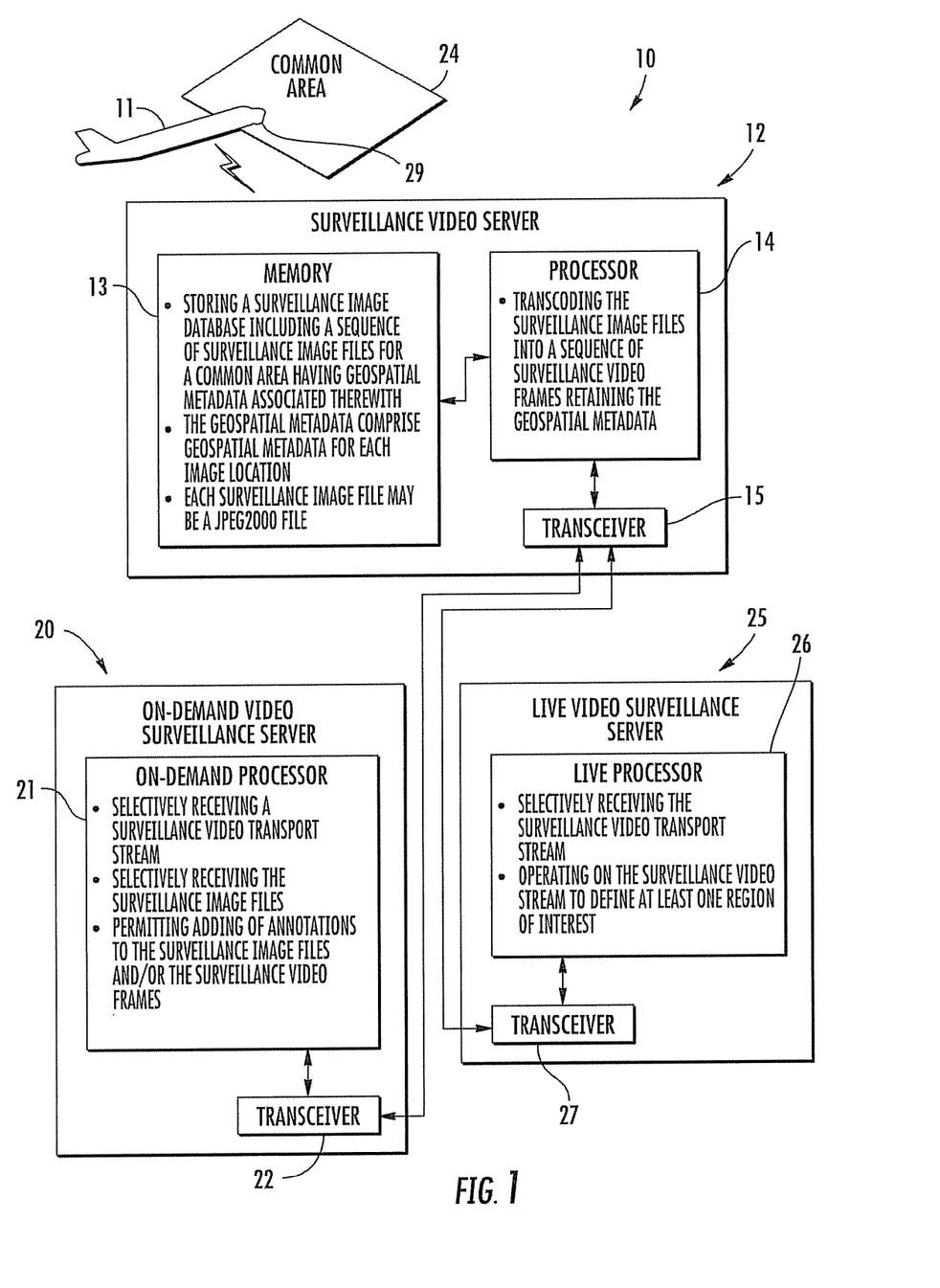
FIG. 1 is a schematic block diagram of a surveillance video system in accordance with the present invention.

Referring initially to FIG. 1, a surveillance video system 10 is now described. The surveillance video system 10 illustratively includes an aerial vehicle 11, such as an unmanned aerial vehicle (UAV) that employs an image sensor array 29 to capture images of a common area 24. The images may be captured then stored in a compressed format, such as JPEG2000, or may be raw unprocessed images. The image sensor array 29 comprises a plurality of digital cameras, for example, six, and collects high-resolution surveillance images. Indeed, the surveillance images may have as many as 10 or more gigapixels. The common area may be an entire city, for example.

The surveillance video system 10 includes a surveillance video server 12 that receives sequences of surveillance image files from the aerial vehicle 11, for example via a network such as the Internet. Alternatively, in some embodiments, the surveillance video server may read the sequences of surveillance image files from a data source, such as a hard drive.

The surveillance video server 12 includes a memory 13 for storing a surveillance image database including a sequence of surveillance images files for the common area 24 and having geospatial metadata associated therewith. The sequence of surveillance files may also have other metadata, such as image acquisition time metadata, associated therewith. In particular, the surveillance image files may be any suitable file format, such as the JPEG2000 format, and the geospatial metadata comprises geospatial metadata for each image location, such as an image source location. It should be appreciated that the surveillance image files may be compressed according to a lossy or lossless compression scheme, depending upon the application and the bandwidth available to the surveillance video system 10.

The surveillance video server 12 includes a processor 14 cooperating with the memory 13 for transcoding the surveillance image files into a sequence of surveillance video frames while retaining the geospatial metadata (and, optionally, other metadata such as SMPTE image acquisition time metadata). Operation of the surveillance video server 12 is now further described with reference to the flowchart 30 of FIG. 2.

Figure 2:
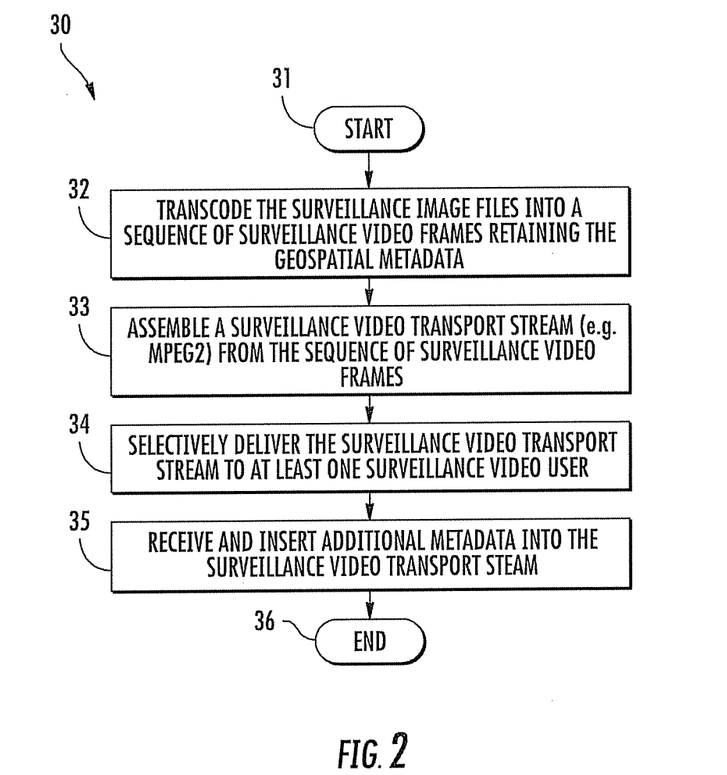
FIG. 2 is a flowchart illustrating a method of operating the surveillance video system of FIG. 1.

After the start, (Block 31), at Block 32 the surveillance image files are transcoded into a sequence of surveillance video frames while retaining the geospatial metadata. More particularly, each surveillance image file may correspond to one or more surveillance video frames, and, during the transcoding, the geospatial metadata associated with a given surveillance image file will be associated with the corresponding surveillance video frames. That is, each surveillance video frame has at least a data field to hold video content and a metadata field to hold metadata associated therewith. The geospatial metadata for a surveillance video frame will be inserted into the metadata field of the surveillance frame during transcoding. It should be appreciated that the entire portions of the surveillance image files need not be transcoded into a sequence of video frames and that, instead, regions of interest of the surveillance image files may be transcoded. This saves storage space and bandwidth.

At Block 33, a surveillance video transport stream is assembled from the sequence of surveillance video frames. The video transport stream may be an MPEG2 transport stream, for example, and may be stored in the memory 13. The transport stream may be of other formats, such as MPEG4 H.264.

At Block 34, the surveillance video transport stream is selectively delivered to at least one surveillance video user. A surveillance video user may add annotations to the surveillance video transport stream (e.g. audio notations, visual notations, etc) and may communicate those annotations back to the surveillance video server 12 as additional metadata. In such a case, at Block 35, the surveillance video server 12 receives and inserts the additional metadata into the surveillance video transport stream. Block 36 indicates the end of operation. Those skilled in the art will understand that the processor 14 may also convert a surveillance video transport stream back into a sequence of surveillance images while preserving the geospatial metadata. In addition, additional added metadata that has been added to the surveillance video transport stream is preserved when the processor 14 converts it back into a sequence of surveillance images. Time code metadata may be used to ensure that each piece of the additional metadata is associated with the proper surveillance image.

The surveillance video users may include an on-demand video surveillance server 20. The on-demand video surveillance server 20 includes an on-demand processor 12 cooperating with a transceiver 22. The on-demand processor 21, via the transceiver 22, selectively receives a surveillance video transport stream. For example, a user may submit a request into the on-demand video surveillance server 20 that a given surveillance video transport stream be transmitted to a user device, such as a laptop computer or desktop computer.

The on-demand processor 21, via the transceiver 22, may also selectively receive the surveillance image files themselves transmit them to a user device. Since compression may occur when the surveillance image files are transcoded, this may advantageously allow a user to see additional details. The on-demand processor 21 may make the sequence of surveillance image files available to the user in a flip-book fashion, allowing the user to view the sequence of surveillance image files at a desired frame rate, such as 2-20 Hz. This allows the user to see the sequence of surveillance image files in a similar fashion to full motion video, but with a greater resolution. When sending the sequence of surveillance image files to the user device, the on-demand processor 21 may send the entire first surveillance image file, and thereafter only send data representing the difference between the first surveillance image file and a given surveillance image file, conserving bandwidth.

The on-demand processor 21 may operate on the surveillance video stream to define at least one region of interest. That is, the on-demand processor 21 may split the surveillance video stream into a plurality of region of interest surveillance video streams, each representing a region of interest. The on-demand processor 21 may then send, via the transceiver 22, at least one region of interest surveillance stream to a user, such as a laptop computer connected to the Internet. By splitting the surveillance video stream into a plurality of region of interest surveillance video streams, bandwidth is conserved as the amount of data sent to the user is greatly reduced (since all such region of interest surveillance video streams need not be sent to the user).

The on-demand processor 21 may facilitate annotation of either the surveillance image files and/or the surveillance video frames by the user, and may then communicate these annotations back to the surveillance video server 12 as additional metadata. The annotations may include data files, such as word processing files or Adobe Acrobat™ files. This additional metadata may then be stored with the surveillance image files and/or the surveillance video frames in the memory 13. While the on-demand processor 21 receives the surveillance video transport stream in a format such as may be viewed by a typical media player, it may receive the surveillance image files in a format such as may be viewed by a special purpose image viewer.

As will be appreciated by those of skill in the art, the on-demand processor 21 may make the surveillance image files and/or the surveillance video frames available to multiple user devices. In one embodiment, when one user makes an annotation to a surveillance image file or a surveillance video frame, the on-demand processor 21 not only communicates that annotation back to the surveillance video server 12 as additional metadata, but also communicates the annotation to others users viewing the same surveillance image files and/or surveillance video frames. In this fashion, users can collaborate in analyzing the surveillance image files and/or surveillance video frames from remote locations.

Furthermore, the on-demand processor 21 may allow communication between the different user devices, allowing different users to voice chat, text chat, etc. This user intercommunication may be time and date coded and communicated back to the surveillance video server 12 as additional metadata for storage, by the on-demand processor 21.

The live video surveillance server 25 includes a live processor 26 cooperating with a transceiver 27. The live processor 26, via the transceiver 27, selectively receives the surveillance video transport stream.

The live processor 26 operates on the surveillance video stream to define at least one region of interest. That is, the live processor 26 may split the surveillance video stream into a plurality of region of interest surveillance video streams, each representing a region of interest. The live processor 26 may then send, via the transceiver 27, at least one region of interest surveillance stream to a user, such as a laptop computer connected to the Internet. The region of interest surveillance streams contain only data and metadata related to the region of interest, advantageously conserving bandwidth. The live processor 26 may also split the surveillance video stream into subsets thereof based upon the acquisition time. For example, a surveillance video stream taken from 12:00 AM to 2:00 AM may be split into a surveillance video stream of the common area from 12:00 AM to 1:00 AM, and a surveillance video stream of the common area from 1:01 AM to 2:00 AM.

It should be noted that the surveillance video server 12 sends the surveillance video transport stream to the live video surveillance server 25 in a format such that a user may view the surveillance video transport stream using a conventional media player. This advantageously allows the live video surveillance server 25 to send the surveillance video transport to a user with a laptop or desktop computer that is equipped with only a conventional media player and not a special purpose media player.

It will be understood by those skilled in the art that the surveillance video system 10 need not have both the on-demand video surveillance server 20 and the live video surveillance server 25. Indeed, in some applications, only one of the on-demand video surveillance server 20 and the live video surveillance server 25 may be present.

Figure 3:
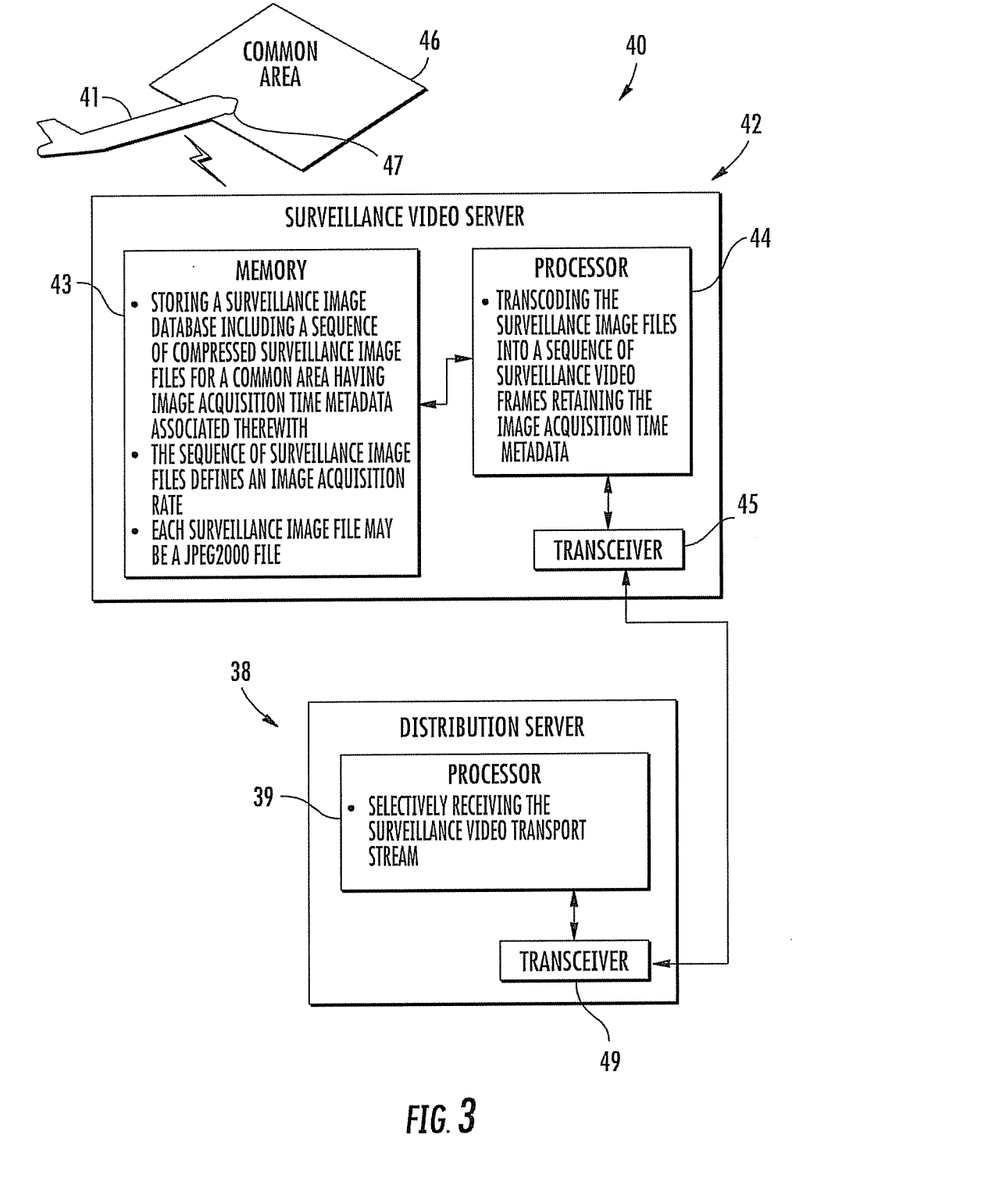
FIG. 3 is a schematic block diagram of another embodiment of a surveillance video system in accordance with the present invention.

Referring now to FIG. 3, another embodiment of a surveillance video system 40 is now described. The surveillance video system 40 includes an aerial vehicle 41 with a camera array 47 that is taking images of a common area 46.

The surveillance video system 40 includes a surveillance video server 42. The aerial vehicle 41 communicates the images of the common area to the surveillance video server 42, for example via a network. The images may be stored in a compressed format, such as JPEG2000, or may be raw unprocessed images.

In turn, the surveillance video server 42 includes a processor 44 cooperating with a memory 43 and a transceiver 45. Stored in the memory 43 is a surveillance image database including a sequence of surveillance image files for a common area having image acquisition time metadata associated therewith. The sequence of surveillance image files may also have other metadata associated therewith, such as geospatial metadata. It should be appreciated that the surveillance images may be JPEG2000 files and may be compressed according to a lossy or lossless compression scheme.

The image acquisition time metadata includes the time at which an associated surveillance image file was captured. Moreover, the sequence of surveillance image files defines an image acquisition rate, for example, if three surveillance images are taken in a second, the image acquisition rate of the sequence is 3 Hz. The image acquisition rate is typically from 1 Hz to 10 Hz.

The processor 44 transcodes the surveillance image files into a sequence of surveillance video frames while retaining the image acquisition time metadata (and, optionally, other metadata associated with the surveillance image files). Those skilled in the art will understand that the processor 44 may also convert a surveillance video transport stream back into a sequence of surveillance image while preserving the image acquisition time metadata.

The surveillance video system 40 includes a distribution server 38. The distribution server includes a processor 39 cooperating with a transceiver 49 for selectively receiving the surveillance transport stream from the surveillance video server 42. The distribution server 38 may then send the surveillance transport stream to a user device, such as a laptop or desktop computer.

Figure 4:
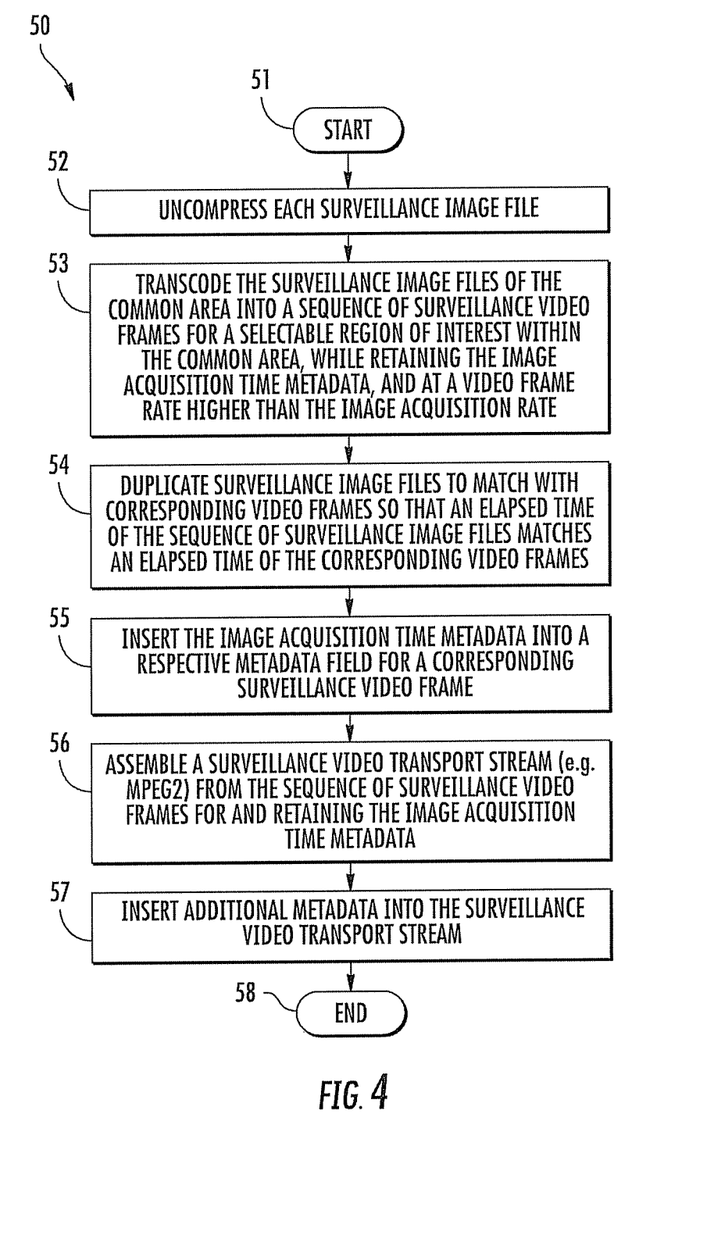
FIG. 4 is a flowchart illustrating a method of operating the surveillance video system of FIG. 3.

Further details of a method of operating the surveillance video server 42 are now given with reference to flowchart 50 of FIG. 4. After the start, (Block 51), at Block 52, each surveillance image file is uncompressed. Of course, if a given surveillance image file was not compressed in the first place, this step will not be performed.

At Block 53, the surveillance image files for the common area are transcoded into a sequence of surveillance video frames, while retaining the image acquisition time metadata. In some applications, the surveillance image frames are transcoded into a sequence of region of interest surveillance video frames for a selectable region of interest within the common area. The transcoding is performed such that the sequence of surveillance video frames has a frame rate higher than the image acquisition rate. Since the image acquisition rate is typically low, and video is typically played at 30 frames per second (29.97 frames per second as per the National Television Systems Committee (NTSC) standards), it is advantageous for the frame rate of the sequence of surveillance video frames to be quicker than the image acquisition rate such that the sequence of surveillance video frames, when played, presents a natural looking image to the user.

At Block 54, surveillance image files are duplicated to match with corresponding video frames so that an elapsed time of the sequence of surveillance image files matches an elapsed time of the corresponding video frames. By way of example, if the sequence of surveillance image files is taken at 3 Hz, and is transcoded to 30 Hz video without the creation of duplicate image files, the elapsed time of the sequence of surveillance image files will be less than an elapsed time of the corresponding video frames by a factor of 10. Therefore, when played, the sequence of surveillance video frames would appear to be in "fast forward," and would not look natural. By adding duplicate image files to the sequence of surveillance image files, the image acquisition rate thereof can be modified to match the frame rate of a video format, and therefore the elapsed time of the sequence of surveillance image files will match an elapsed time of the corresponding video frames.

At Block 55, the image acquisition time metadata is inserted into a respective metadata field for a corresponding video frame. At Block 56, a surveillance video transport stream is assembled from the sequence of surveillance video frames while retaining the image acquisition time metadata. The surveillance video transport stream may be a MPEG2 transport stream, for example, although other suitable transport streams may also be used.

Figure 5:
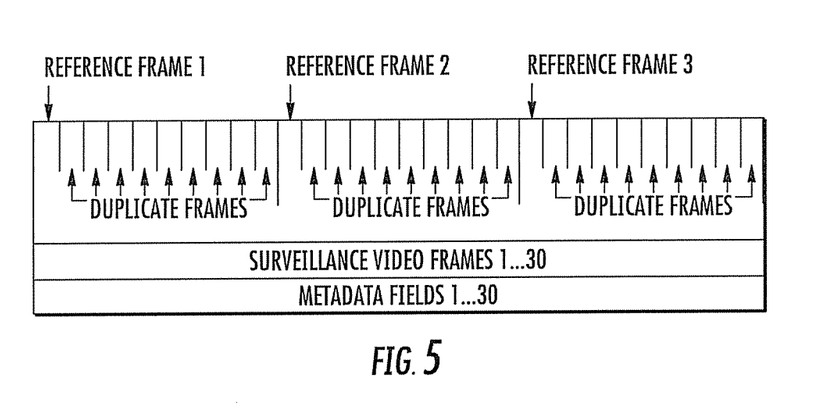
FIG. 5 is a schematic representation of a sequence of surveillance video frames in accordance with the present invention.

The surveillance video transport stream, as shown in FIG. 5, includes reference frames and duplicate frames. In this example, the surveillance video transport stream includes thirty frames, each frame having its own metadata field. There are three reference frames (Reference Frame 1, Reference Frame 2, and Reference Frame 3), indicating that the surveillance images were taken at 3 Hz. Each reference frame corresponds to a respective surveillance image file. Each reference frame is duplicated nine times, and the duplicates of each reference frame follow directly thereafter in the surveillance video transport stream.

If the surveillance video transport stream is a MPEG2 transport stream, as known to those skilled in the art, the I-frames will correspond to the reference frames, and the P and B frames will correspond to the duplicate frames. Of course, in some applications, the P and B frames need not be used, and additional I-frames may correspond to the duplicate frames. The metadata associated with each frame will be placed in a program identification field (PID) for that frame.

A surveillance video user may add annotations to the surveillance video transport stream, for example, audio notations, visual notations, and may communicate those annotations back to the surveillance video server 42 as additional metadata. The annotations may include data files, such as word processing files or Adobe Acrobat™ files. In such a case, at Block 57, the surveillance video server 42 receives and inserts the additional metadata into the surveillance video transport stream. Block 58 indicates the end of operation.

In other embodiments, the image acquisition rate could be higher than the frame rate of the surveillance video transport stream. In other words, extra frames from the image acquisition would have to be removed/decimated to match the desired frame rate.

Referring now additionally to FIGS. 6-9, another embodiment of a surveillance video system 110. Moreover, with reference to the flowchart 130 of FIG. 8, another aspect directed to a method of operating the surveillance video system 110 is also now described, which begins at Block 131. The surveillance video system 110 illustratively includes a first device 120, and a second device 100 communicating therewith (Block 133).

Figure 7:
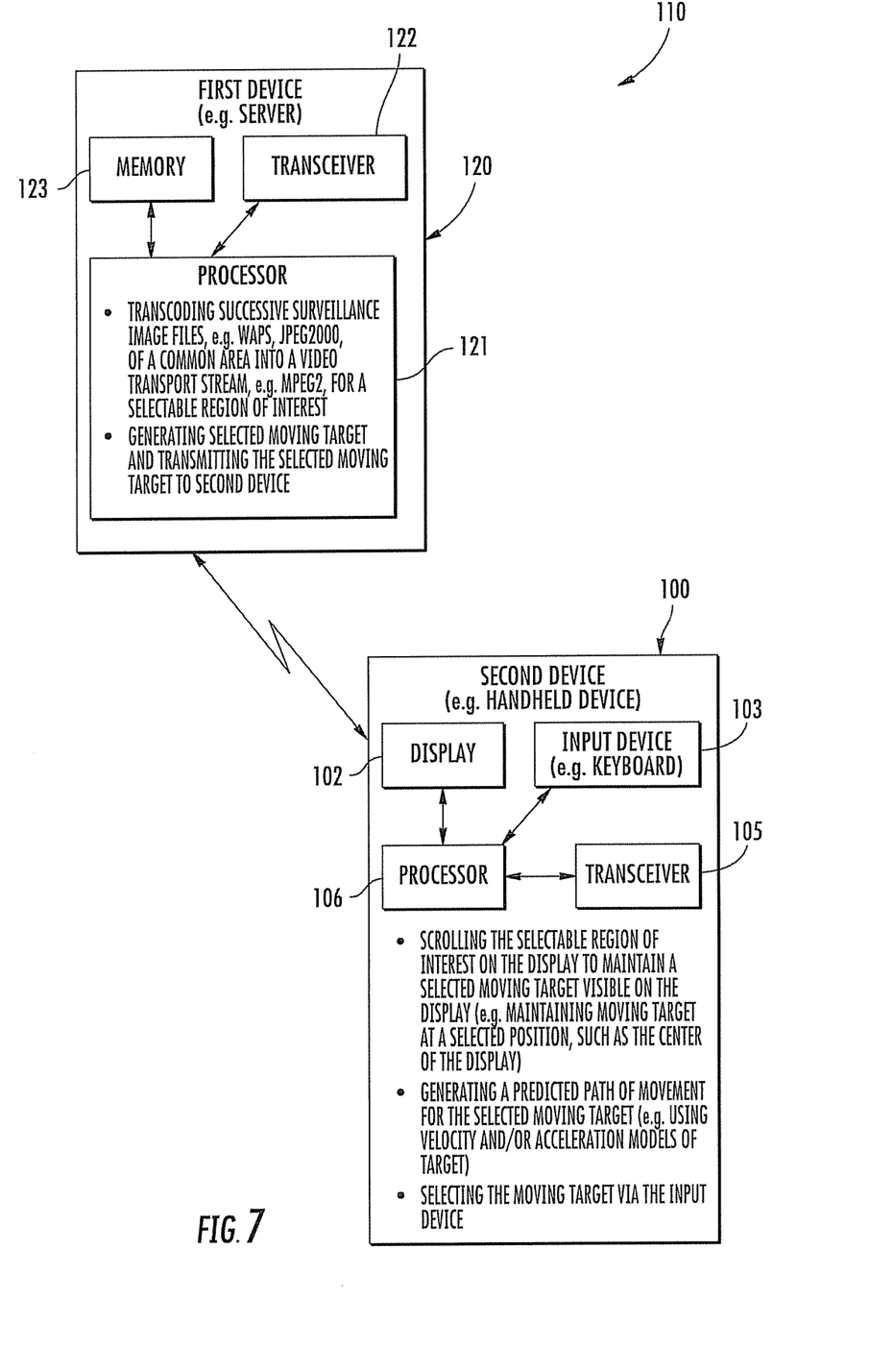
FIG. 7 is a schematic block diagram of a surveillance video system, according to the present invention.

The first device 110 illustratively includes a processor 121, a memory 123 cooperating therewith, and a transceiver 122 also cooperating with the processor for communicating with the second device 100. The memory 123 stores a plurality of surveillance image files 151 (FIG. 9) of a geographical area. The surveillance image files 151 cover the same geographical area over a certain time period, i.e. they provide time lapsed coverage of a common area, for example, at a rate of 1 Hz or greater. For example, each of the plurality of surveillance image files 151 may comprise a WAPS image using the JPEG2000 format. As will be appreciated by those skilled in the art, each surveillance image file 151 covers a large geographical area, for example, city-wide images covering many miles. Moreover, each surveillance image file 151 has a large resolution value, for example, in the range of 0.1-10 gigapixels.

Figure 6:
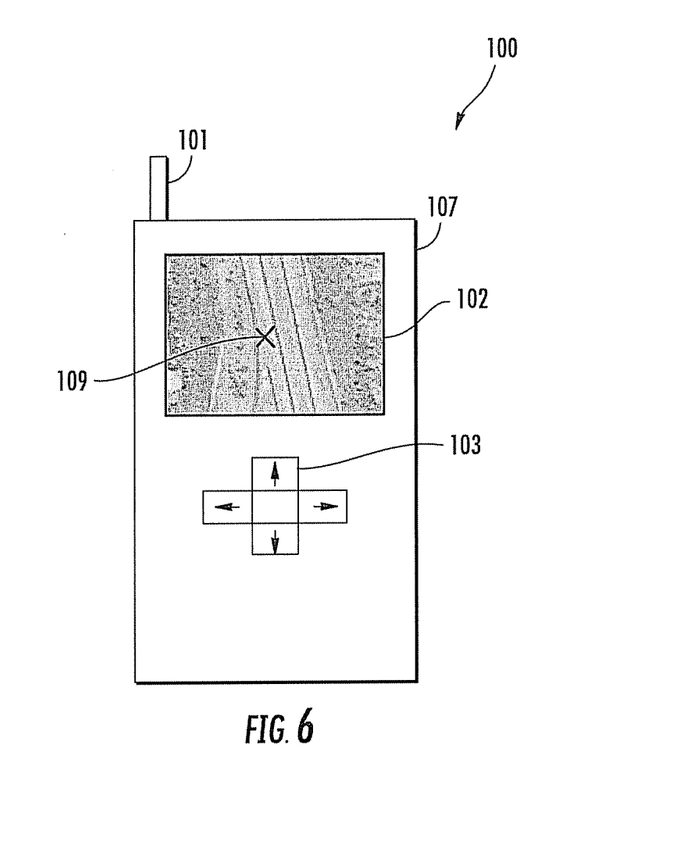
FIG. 6 is a schematic front elevational view of a surveillance video device, according to the present invention.

The second device 100 illustratively includes a housing 107, an antenna 101 carried by the housing, and a display 102 also carried by the housing. For example, the display 102 may have a relatively low resolution of 800×800 pixels. The antenna 101 may include at least one of, for example, a Worldwide Interoperability for Microwave Access (WiMAX) antenna, an ultra high frequency (UHF) antenna, and a very high frequency (VHF) antenna. The second device 100 also illustratively includes an input device 103, for example, the illustrated directional keypad. Also, in other embodiments, the second device 100 could include at least one of a push-to-talk (PTT) control pad and an alphanumeric keypad. Further, the second device 100 also illustratively includes a processor 106, and transceiver 105 cooperating therewith for communication with the first device 120.

Figure 10:
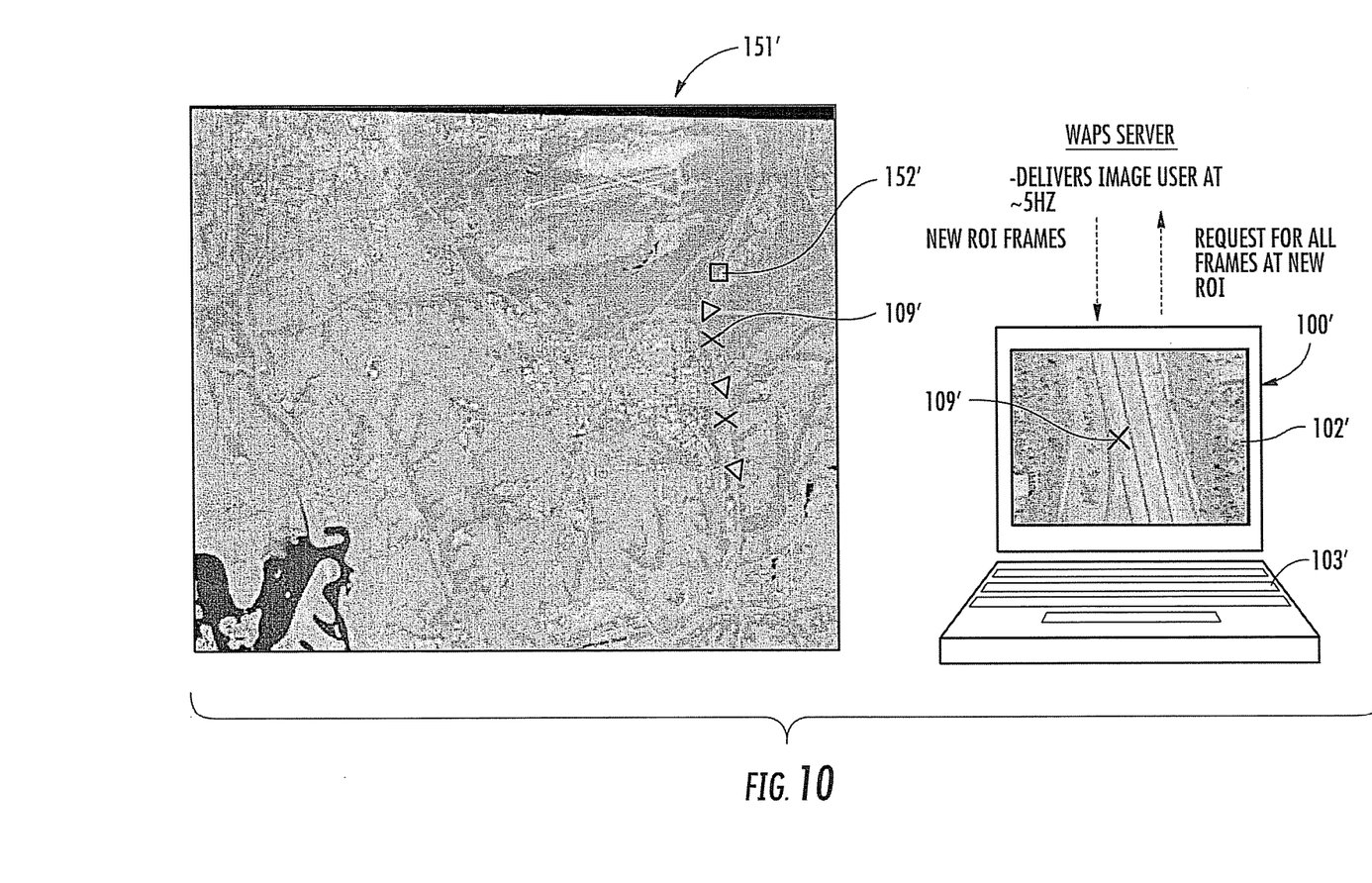
FIG. 10 is a diagram of another embodiment of the surveillance video device, according to the present invention.
Figure 11A:
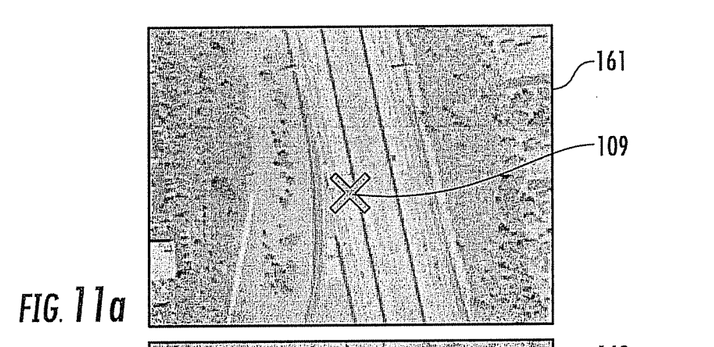
FIGS. 11a-11d are a sequence of diagrams illustrating frames from the video transport stream in the surveillance video system of FIG. 7.
Figure 11B:
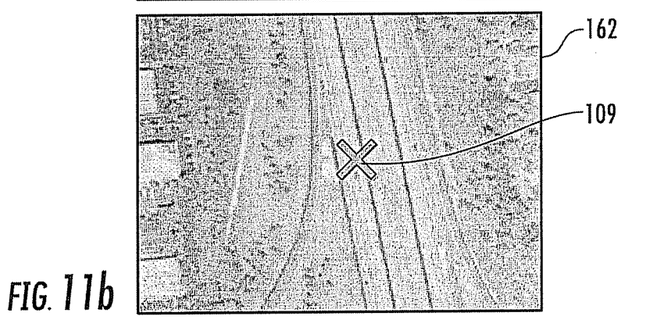
Figure 11C:
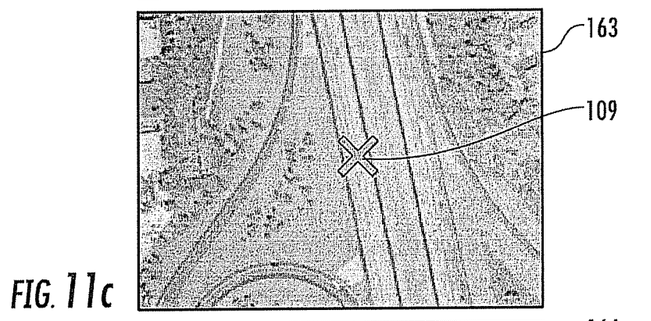
Figure 11D:
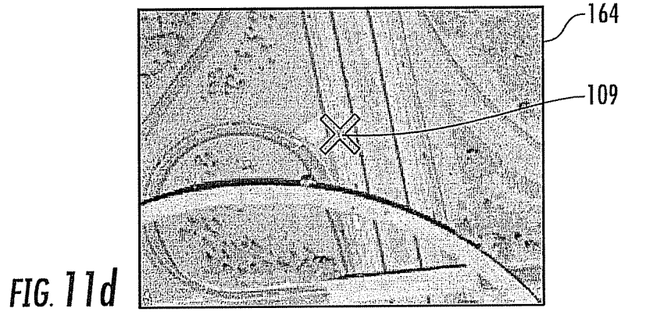

Although the second device 100 is illustrated as a handheld communications device, other form factors may be used, for example, a laptop computer (FIG. 10). Furthermore, the second device 100 may be remote in location to the first device 110, for example, the distant handheld second device may communicate with a centrally located first device operating as a server.

Figure 8:
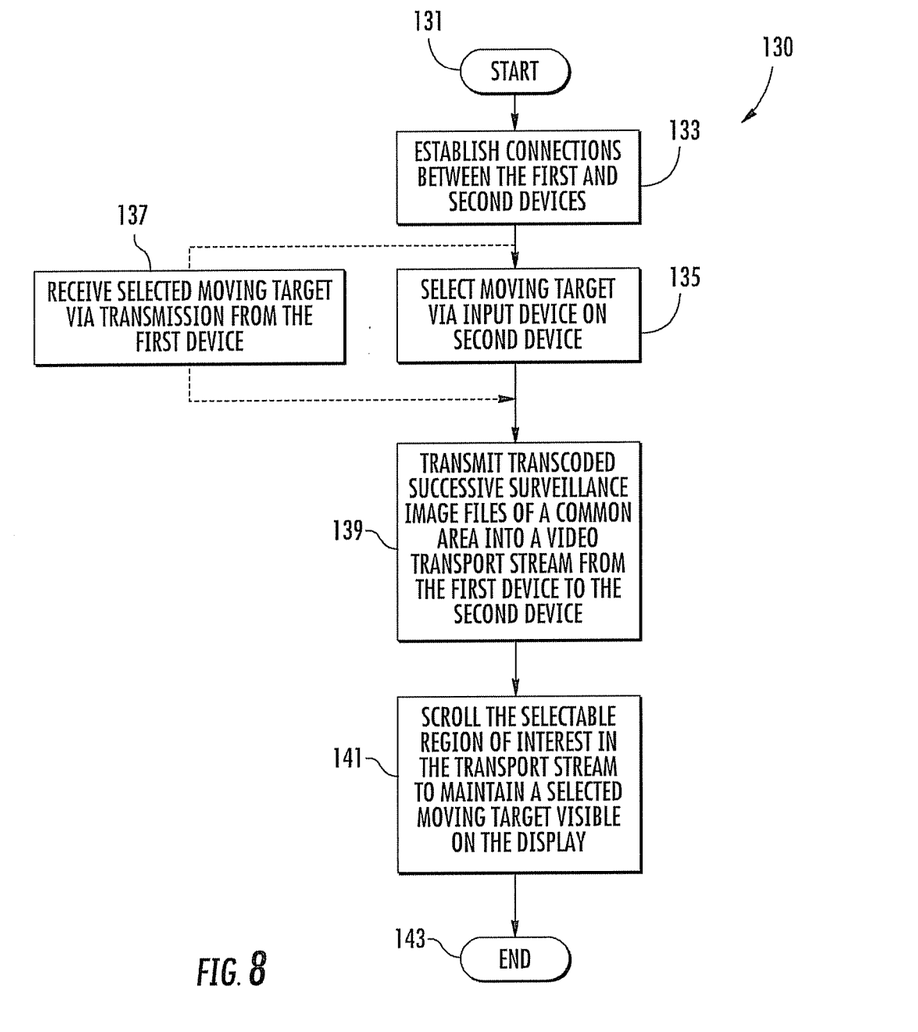
FIG. 8 is a flowchart illustrating operation of the surveillance video system of FIG. 7.
Figure 9:
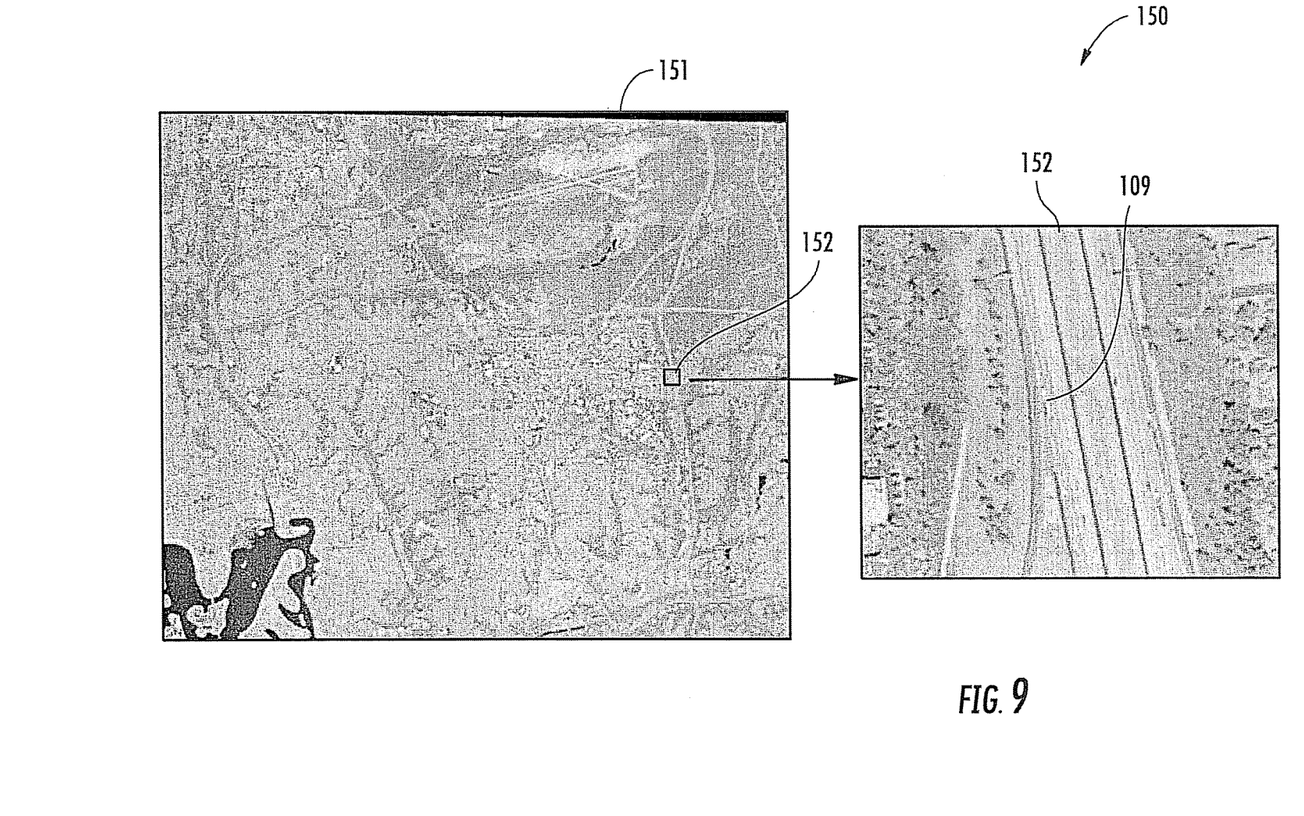
FIG. 9 is a diagram illustrating the surveillance image file and the selected region of interest in the surveillance video system of FIG. 7.

As will be appreciated by those skilled in the art, the user of the second device 100 may desire to remotely track a moving target 109 within the coverage of surveillance image files 151 without the typical complex computer system. At Block 135, the user selects the moving target 109 for tracking with the surveillance video system 110. As shown in dashed lines, in other embodiments, the selected target 109 may be received via transmission from the first device 120. (Block 137). Since the surveillance image files 151 cover a very large area and have a relatively high resolution, only a portion of each surveillance image file 151 can be shown on the small relatively low resolution display 102. Further, the communications bandwidth between the first 120 and second 100 devices is typically limited. Indeed, as perhaps best seen in the diagram 150 of FIG. 9, only a selectable region of interest 152 may be displayed, the selectable region being many times smaller than each surveillance image file 151. In short, the second device 100 can only display and readily update a small part of the information in each surveillance image file 151.

Once the moving target 109 has been selected, the processor 106 is illustratively configured to generate a predicted path of movement for the selected moving target. Of course, the generation of the predicted path is most useful when tracking of the moving target 109 is not possible, for example, during object occlusion. For example, in certain embodiments, the processor 106 may be configured to generate the predicted path of movement based upon at least one of a velocity and an acceleration of the selected moving target. In other embodiments, the processor 106 may be configured to generate the predicted path of movement based upon a kernel based tracking method. In other advantageous embodiments, the processor 106 may be configured to generate the predicted path of movement based upon the method disclosed in the co-pending application titled "VIDEO PROCESSING SYSTEM PROVIDING OVERLAY OF SELECTED GEOSPATIALLY-TAGGED METADATA RELATING TO A GEOLOCATION OUTSIDE VIEWABLE AREA AND RELATED METHODS," Ser. No. 12/634,760, also assigned to the present application's assignee and herein incorporated by reference in its entirety. Helpfully, the processor 106 generates the predicted path even when the selected moving target 109 is lost due to occlusion, for example.

Based upon the predicted path of movement of the selected moving target 109, the processor 106 requests via the transceiver 105 that the first device 120 transmits another corresponding portion of the surveillance image file 151. Indeed, as perhaps best seen in FIGS. 11a-11d, the first device 120 is illustratively configured to transcode corresponding portions 161-164 of a plurality of successive surveillance image files 151 of the common area into a video transport stream for the selected region of interest 152 within the common area (Block 139). For example, the video transport stream may comprise a MPEG2 transport stream and have a fresh rate of at least 3 Hz, for example. In other embodiments, the first device 120 may be configured to process corresponding portions 161-164 of the plurality of successive surveillance image files 151 of the common area into an image transport stream for the selected region of interest 152 within the common area. In other words, the user of the second device 100 could flip through still imagery showing motion of the moving target 109.

The processor 106 is illustratively configured to scroll the selectable region of interest 152 to maintain the selected moving target 109 visible on the display 102. Additionally, the processor 106 may be configured to scroll the selectable region of interest 152 to maintain the selected moving target 109 at a selected position on the display 102, for example, a center of the display (Block 141).

In the illustrated embodiment, the input device 103 permits the user of the second device 100 to select the moving target 109. Of course, in other embodiments, the first device 120 may be configured to permit selection of the selected moving target 109 (Block 137). The method ends at Block 143.

Advantageously, the display 102 of the second device 100 adaptively scrolls with the selected moving target 109 without constant user input. Moreover, the second device 100 of the surveillance video system 110 may request and download only the needed relevant region of interest 152 for the surveillance image file 151 and not the entire large surveillance image file. This helpfully automatically provides the user with continuously updated tracking of the selected moving target 109 without needing a large bandwidth communications channel, as will be appreciated by those skilled in the art.

Another aspect is directed to a video device 100 for communicating with a server 120 being remote therefrom and being configured to transcode a plurality of successive image files 151 of a common area into a video transport stream for a selectable region of interest 152 within the common area. The video device 100 may comprise a display 102, an input device 103 to permit selection of a moving target 109, and a processor 106. The processor 106 may cooperate with the display 102 and the input device 103 and may be configured to scroll the selectable region of interest 152 to maintain the selected moving target 109 visible on the display 102.

Referring now additionally to FIG. 10, another embodiment of the surveillance video system 110' is now described. In this embodiment of the surveillance video system 110', those elements already discussed above with respect to FIGS. 6-9 are given prime notation and most require no further discussion herein. This embodiment differs from the previous embodiment in that this surveillance video system 110' has a second device 100' having a laptop form factor. Moreover, this surveillance video system 110' transmits the video transport stream with the exemplary refresh rate of 5 Hz.

Figure 12:
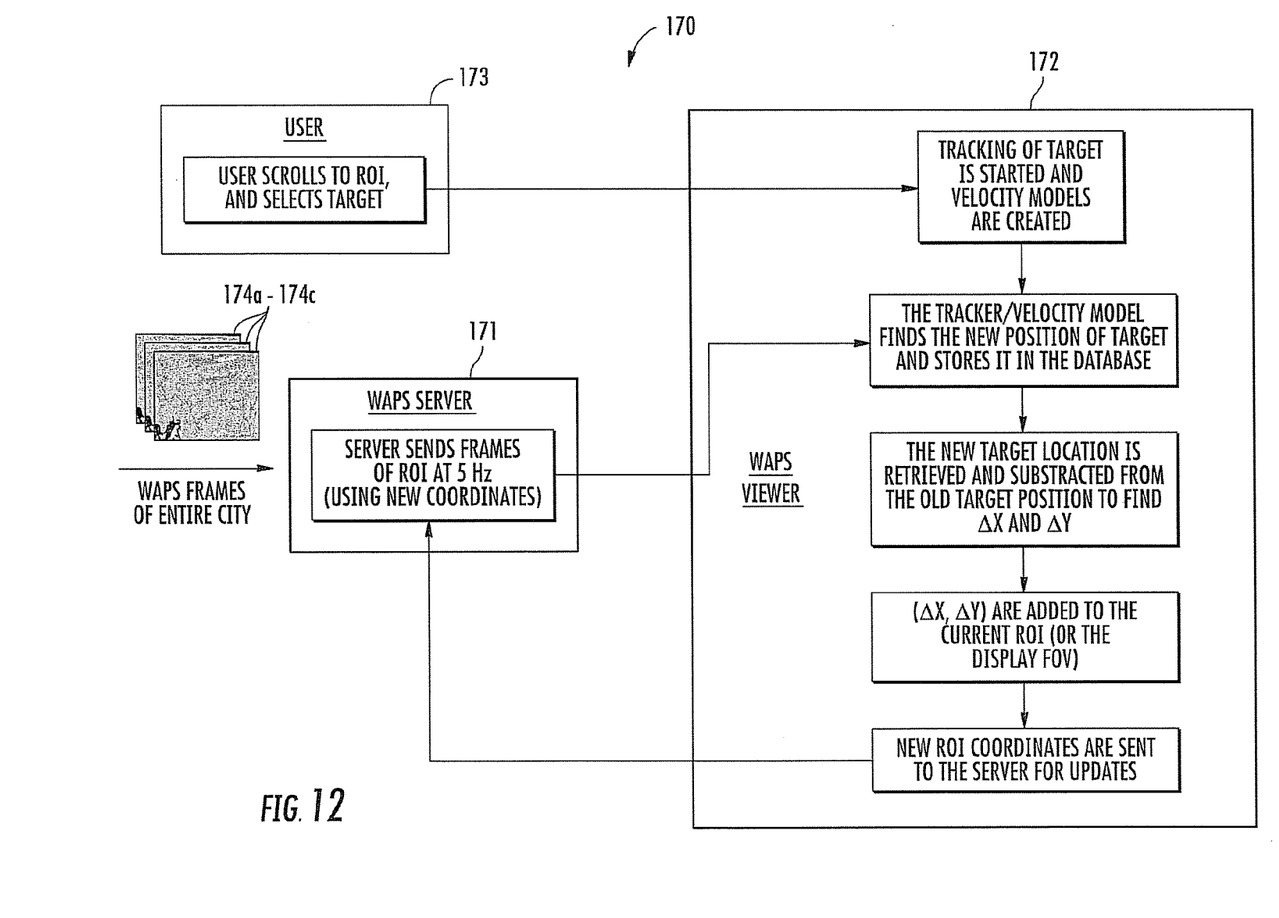
FIG. 12 is a diagram of another embodiment of the surveillance video system, according to the present invention.

Referring now additionally to FIG. 12, as will be appreciated by those skilled in the art, an exemplary implementation 170 of the surveillance video system 110 is illustrated. This surveillance video system 170 illustratively includes a user 173 scrolling the selected region of interest over the selected moving target. This surveillance video system 170 illustratively includes a WAPS server 171 receiving a plurality of WAPS frames 174a-174c of an entire city, and a WAPS viewer 172. The WAPS viewer 172 WAPS viewer tracks the selected moving target using velocity models, and generates the new position of the selected moving target for storage. Furthermore, the WAPS viewer 172 WAPS viewer generates the new target location and subtracts it from the old target location to find changes in position. The WAPS viewer 172 WAPS viewer adds the change in position to the current region of interest and new coordinates are sent to the WAPS server 171 for updates.

Other features relating to surveillance video systems are disclosed in co-pending applications: titled "SURVEILLANCE SYSTEM WITH TARGET BASED SCROLLING AND RELATED METHODS," Ser. No. 12/579,186; and titled "SURVEILLANCE SYSTEM FOR TRANSCODING SURVEILLANCE IMAGE FILES WHILE RETAINING IMAGE ACQUISITION TIME METADATA AND ASSOCIATED METHODS," Ser. No. 12/579,204, all incorporated herein by reference in their entirety.

Although the above disclosed surveillance video devices and systems relate to surveillance applications, these herein disclosed devices and systems could also be used for other purposes. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A surveillance video system comprising:
a surveillance image database storing a sequence of surveillance image files for a common area having geospatial metadata associated therewith; and
a processor cooperating with said surveillance image database and configured to
split the sequence of surveillance image files into a plurality of region of interest surveillance video streams, each representing a region of interest,
transcode a selected region of interest into a sequence of surveillance video frames retaining the geospatial metadata while ignoring non-selected region of interests,
assemble a surveillance video transport stream for the selected region of interest from the sequence of surveillance video frames retaining the geospatial metadata while ignoring the non-selected region of interests, and
selectively deliver the surveillance video transport stream for the selected region of interest retaining the geospatial metadata to at least one surveillance video user while ignoring non-selected region of interests.

2. The surveillance video system according to claim 1 further comprising at least one on-demand video surveillance server configured to selectively receive the surveillance video transport stream retaining the geospatial metadata.

3. The surveillance video system according to claim 2 wherein said at least one on-demand video surveillance server comprises an on-demand processor configured to selectively receive the surveillance image files retaining the geospatial metadata.

4. The surveillance video system according to claim 3 wherein said at least one on-demand video surveillance server comprises an on-demand processor configured to permit adding of annotations to at least one of the surveillance image files and the surveillance video frames.

5. The surveillance video system according to claim 1 further comprising at least one live video surveillance server configured to selectively receive the surveillance video transport stream retaining the geospatial metadata.

6. The surveillance video system according to claim 5 wherein said at least one live video surveillance server comprises a live video surveillance processor configured to operate on the surveillance video stream to define at least one region of interest.

7. The surveillance video system according to claim 1 further comprising:
at least one on-demand video surveillance server selectively receiving at least the surveillance video transport stream retaining the geospatial metadata; and
at least one live video surveillance server selectively receiving at least the surveillance video transport stream retaining the geospatial metadata.

8. The surveillance video system according claim 1 wherein said processor is also configured to receive and insert additional metadata into the surveillance video transport stream.

9. The surveillance video system according to claim 1 wherein the geospatial metadata comprises geospatial metadata for each image location.

10. The surveillance video system according to claim 1 wherein each surveillance image file comprises a Joint Photographic Experts Group (JPEG) 2000 file.

11. The surveillance video system according to claim 1 wherein the surveillance video transport stream comprises a Moving Picture Experts Group 2 (MPEG2) transport stream.

12. A surveillance video system comprising:
a processor configured to
split a sequence of surveillance image files for a common area having geospatial metadata associated therewith into a plurality of region of interest surveillance video streams, each representing a region of interest,
transcode a selected region of interest into a sequence of surveillance video frames retaining the geospatial metadata while ignoring non-selected region of interests,
assemble a surveillance video transport stream for the selected region of interest from the sequence of surveillance video frames retaining the geospatial metadata while ignoring the non-selected region of interests, and
selectively deliver the surveillance video transport stream for the selected region of interest retaining the geospatial metadata to at least one surveillance video user while ignoring non-selected region of interests.

13. The surveillance video system according to claim 12 further comprising at least one on-demand video surveillance server configured to selectively receive the surveillance video transport stream retaining the geospatial metadata.

14. The surveillance video system according to claim 13 further comprising at least one live video surveillance server configured to selectively receive the surveillance video transport stream retaining the geospatial metadata.

15. A video system comprising:
a processor configured to
split a sequence of surveillance image files for a common area having geospatial metadata associated therewith into a plurality of region of interest surveillance video streams, each representing a region of interest,
transcode a selected region of interest into a sequence of video frames retaining the geospatial metadata while ignoring non-selected region of interests,
assemble a video transport stream for the selected region of interest from the sequence of video frames retaining the geospatial metadata while ignoring the non-selected region of interests, and
selectively deliver the video transport stream for the selected region of interest retaining the geospatial metadata to at least one surveillance video user while ignoring the non-selected region of interests.

16. The video system according to claim 15 further comprising at least one on-demand video server configured to selectively receive the video transport stream retaining the geospatial metadata.

17. The video system according to claim 16 further comprising at least one live video server configured to selectively receive the video transport stream retaining the geospatial metadata.

18. A method of operating a surveillance video system comprising:
storing a sequence of surveillance image files for a common area having geospatial metadata associated therewith in a surveillance image database;
splitting the sequence of surveillance image files into a plurality of region of interest surveillance video streams, each representing a region of interest;

transcoding, using a processor, a selected region of interest into a sequence of surveillance video frames retaining the geospatial metadata while ignoring non-selected region of interests;

assembling, using the processor, a surveillance video transport stream for the selected region of interest from the sequence of surveillance video frames retaining the geospatial metadata while ignoring non-selected region of interests; and selectively delivering, using the processor, the surveillance video transport stream for the selected region of interest retaining the geospatial metadata to at least one surveillance video user while ignoring non-selected region of interests.

19. The method according to claim 18 further comprising configuring at least one on-demand video surveillance server to selectively receive the surveillance video transport stream retaining the geospatial metadata.

20. The method according to claim 19 further comprising configuring the at least one on-demand video surveillance server to selectively receive the surveillance image files retaining the geospatial metadata.

21. The method according to claim 20 further comprising configuring the at least one on-demand video surveillance server to permit adding of annotations to at least one of the surveillance image files and the surveillance video frames.

22. The method according to claim 18 further comprising configuring at least one live video surveillance server to selectively receive the surveillance video transport stream retaining the geospatial metadata.

23. The method according to claim 22 further comprising configuring the said at least one live video surveillance server to operate on the surveillance video stream to define at least one region of interest.

* * * * *